(12) United States Patent
Lewis

(10) Patent No.: US 7,010,416 B2
(45) Date of Patent: Mar. 7, 2006

US007010416B2

(54) SYSTEMS AND METHODS FOR RESETTING VEHICLE EMISSION SYSTEM ERROR INDICATORS

(75) Inventor: Marshall J. Lewis, Lilburn, GA (US)

(73) Assignee: PH2 Solutions, Inc., West Orange, NJ (US)

( * ) Notice: Subject to any disclaimer, the term of this patent is extended or adjusted under 35 U.S.C. 154(b) by 0 days.

(21) Appl. No.: 10/762,190

(22) Filed: Jan. 20, 2004

(65) Prior Publication Data

US 2004/0215386 A1 Oct. 28, 2004

Related U.S. Application Data

(60) Provisional application No. 60/440,910, filed on Jan. 17, 2003.

(51) Int. Cl.
*B60T 7/12* (2006.01)

(52) U.S. Cl. ...................... 701/109; 701/114; 324/327; 123/691

(58) Field of Classification Search ................ 701/109, 701/114; 123/691, 692; 324/327, 379, 380; 60/276
See application file for complete search history.

(56) References Cited

U.S. PATENT DOCUMENTS

| | | | | |
|---|---|---|---|---|
| 5,131,372 | A * | 7/1992 | Nakaniwa | 123/673 |
| 5,373,822 | A * | 12/1994 | Thompson | 123/520 |
| 5,671,141 | A * | 9/1997 | Smith et al. | 701/29 |
| 6,553,754 | B1 * | 4/2003 | Meyer et al. | 60/277 |
| 6,615,577 | B1 * | 9/2003 | Meyer et al. | 60/276 |
| 6,691,020 | B1 * | 2/2004 | Meyer et al. | 701/108 |
| 2003/0004634 | A1 * | 1/2003 | Meyer et al. | 701/108 |
| 2003/0200025 | A1 * | 10/2003 | Ross | 701/200 |
| 2003/0217025 | A1 * | 11/2003 | Costantino | 707/1 |
| 2005/0188218 | A1 * | 8/2005 | Walmsley et al. | 713/200 |

* cited by examiner

*Primary Examiner*—John T. Kwon
(74) *Attorney, Agent, or Firm*—IP Counsel Consultants; Michael E. Melton

(57) ABSTRACT

A method of resetting an active emissions system error indictor associated with a vehicle. The method comprises performing a first requesting step and a second requesting step until the active emissions system error indicator resets in response to the first or second requesting steps. In one embodiment, the first requesting step comprises requesting a first type of information (e.g., information from a first vehicle oxygen sensor) from a vehicle computer associated with the vehicle, and the second requesting step comprises requesting a second type of information (e.g., information from a second vehicle oxygen sensor) from the vehicle computer. In a particular embodiment of the invention, an electronic tool, such as a bi-directional scan tool, is used to perform the first and second requesting steps.

57 Claims, 2 Drawing Sheets

SYSTEMS AND METHODS FOR RESETTING VEHICLE EMISSION SYSTEM ERROR INDICATORS

CROSS-REFERENCE TO RELATED APPLICATIONS

This application claims the benefit of U.S. provisional patent application 60/440,910 entitled "Systems and Methods for Resetting Automobile Emission System Error Indicators", which was filed on Jan. 17, 2003, and which is hereby incorporated herein by reference in its entirety.

BACKGROUND OF THE INVENTION

It has become apparent that gas emissions from vehicles (such as automobiles) can contribute to air pollution, especially in particularly congested areas, such as large cities. Accordingly, modern vehicles are equipped with sophisticated emissions systems that are configured to reduce harmful emissions from the vehicle. These vehicles are also equipped with a variety of sophisticated emissions-related devices for informing the vehicle's owner and vehicle technicians if the vehicle's emissions systems are not functioning properly.

One such emissions-related device is a "check engine" light (or malfunction indicator light), which is commonly located on the vehicle's dashboard. Such "check engine" lights are typically configured to illuminate when the vehicle's on-board computer detects a problem with the vehicle's emissions system.

The vehicle is also equipped with a variety of emissions-related sensors that are configured to monitor (either continuously or intermittently) various aspects of the vehicle's emissions system. These sensors are configured to transmit data to a computer within the vehicle for analysis by the computer. If the computer determines that data from one or more of the sensors is indicative of a problem within the vehicle's emissions system, the computer activates one or more system error indicators (which are commonly referred to as readiness monitor points or "flags"). These system error indicators are then used to help technicians diagnose and repair the vehicle's emissions system. In addition, the system error indicators may be used by state-certified emissions testing authorities to determine whether the vehicle meets state emissions standards.

In many states, such as Georgia, in order for a vehicle to pass a regularly scheduled emissions test, the vehicle's "check engine" light must be off, and the vehicle must not have any currently active system error indictors (e.g., the vehicle's OBD II readiness monitors must not indicate that there is a problem with the vehicle's emissions-related systems or components). If a vehicle fails inspection, the owner typically takes the vehicle to a mechanic who uses a diagnostic tool, such as a "scan tool", to determine which of the vehicle's system error indicators are currently active. The mechanic then uses this information to determine which, if any, specific repairs are needed to bring the vehicle into compliance with emissions standards.

Once the repairs are done, it is necessary to deactivate or "reset" any active system error indicators. To do this, a technician typically puts the vehicle through a "drive cycle", such as the Ford P1000, I/M Readiness Code Drive Cycle. As will be understood by one skilled in the art, during the "drive cycle", the vehicle is operated in various prescribed ways for specified periods of time.

When putting the vehicle through the drive cycle, the technician also activates various vehicle systems, such as the vehicle's air conditioning system. If all of the vehicle's systems are functioning properly, and if the drive cycle is executed properly by the technician, all of the vehicle's active system error indicators will reset automatically in response to the vehicle being put through the drive cycle. Technicians typically attach a scan tool to the vehicle while performing the drive cycle to manually verify, in real time, that the vehicle's system error indicators are resetting properly.

Once the technician determines that all of the vehicle's system error indicators have reset properly, the vehicle's owner takes the vehicle back to an emissions testing facility where an emissions tester verifies that the vehicle's check engine light is not illuminated, and that none of the vehicle's system error indicators are "active" (e.g., that the current status of all the vehicle's readiness monitors is "ready"). Once this verification process is complete, the vehicle is certified as having passed the emissions test.

One problem with the current emissions testing process is that the prior art process of resetting active system error indicators is unnecessarily time-consuming. This is due to the fact that standard drive cycles typically require that the vehicle be driven for at least 40 minutes to properly complete the drive cycle. In fact, it commonly takes an hour or more to properly reset a vehicle's system error indicators using prior art techniques.

Another problem with current emissions testing processes is that the prior art process of resetting active system error indicators is often difficult and unsafe. This is due to the fact that standard drive cycles often require that the vehicle be driven in a rigorously prescribed manner in order to reset the various system error indicators. For example, the Ford drive cycle referenced above requires that a driver drive the vehicle continuously for 10 minutes at a speeds of 45–65 mph while avoiding sharp turns and hills. This can be difficult and unsafe to achieve in certain settings, especially on the congested roadways common to most major cities.

Accordingly, there is a need for an improved method and apparatus for resetting active emissions system error indicators that may be performed quickly and safely.

SUMMARY OF THE INVENTION

Various embodiments of the present invention provide improved methods and apparatuses for quickly and safely resetting active emissions system error indicators within a vehicle (such as an automobile). One embodiment of the invention is a method of resetting active emissions system error indicators by requesting two or more different types of information from the vehicle's computer. In one embodiment of the invention, the method comprises requesting, in a pre-determined sequence, two or more different types of information from the vehicle's computer. In a further embodiment of the invention, a tool (preferably an electronic tool, such as a scan tool, and preferably a bi-directional scan tool) is used to request the two or more different types of information from the vehicle's computer. In one embodiment of the invention, the scan tool is the Professional Enhanced Scan Tool (Model Number MD2001A), which is currently manufactured by Actron Manufacturing Company of Cleveland Ohio. The current user manual for this scan tool was included in Appendix B of the provisional patent application referenced above, which is incorporated herein by reference.

In one embodiment of the invention, each of the two or more different types of information requested from the vehicle's computer includes emissions-related information. This information is preferably information that has been acquired from one or more sensors within the vehicle, each of which is preferably adjacent to or within the vehicle's engine. A particular embodiment of the invention is a method of resetting active emissions system error indicators by requesting, in sequence, two or more different types of information from a vehicle's power train control module (PCM). This is preferably done electronically using a scan tool, such as the Professional Enhanced Scan Tool referenced above.

In one embodiment of the invention, the method of resetting one or more active emission system error indicators comprises requesting, in sequence, three, four, five, six, seven, eight or more different types of information from a vehicle computer.

In a particular embodiment of the invention, the step of requesting two or more different types of information from the vehicle computer comprises the step of requesting information from a first oxygen sensor within the vehicle. The inventive method preferably also comprises the step of requesting information from a second oxygen sensor within the vehicle. One embodiment of the inventive method also preferably comprises the step of requesting information from a third oxygen sensor within the vehicle. In various embodiments of the invention, the inventive method comprises requesting one to nine or more values from different oxygen sensors within the vehicle. Such oxygen sensors may include, for example: (1) an oxygen sensor that is adjacent a first cylinder bank and that is upstream of a first catalyst associated with the first cylinder bank; (2) an oxygen sensor that is adjacent the first cylinder bank and that is downstream of the first catalyst associated with the first cylinder bank; (3) an oxygen sensor that is adjacent a second cylinder bank and that is upstream of a first catalyst associated with the second cylinder bank; (4) an oxygen sensor that is adjacent the second cylinder bank and that is downstream of the first catalyst associated with the second cylinder bank. Other such sensors are described on Pages 3–6 of the user manual for the Professional Enhanced Scan Tool referenced above.

As noted above, the user preferably requests information from the various oxygen sensors using a scan tool, such as the Professional Enhanced Scan Tool referenced above or other bi-directional scan tool. Such bi-directional scan tools are well known in the art and include: (1) model KM9640 by Actron Manufacturing Company; and (2) the Mastertech MTS Tech 1A by Vetronix Corporation.

As will be understood by one skilled in the art, users may alternatively use any other suitable device to request information from the vehicle's various sensors. For example, a Visor Personal Digital Assistant equipped with D101 Visor "OTTOSCAN" software may be suitable for this purpose.

In a preferred embodiment of the invention, the step of requesting two or more different types of information from the vehicle computer comprises performing one or more "non-continuous tests" on the vehicle's engine. Such tests are known in the art and are described in greater detail on pages 3–7 and 3–8 of the Professional Enhanced Scan Tool User Manual referenced above. In a preferred embodiment of the invention, at least one of these non-continuous tests provides test results from a catalyst monitor. In a further preferred embodiment of the invention, at least one of the non-continuous tests provides test results from an evaporative OBD II monitor.

In one embodiment of the invention, the step of requesting two or more different types of information from the vehicle computer comprises a first step of requesting a first set of information (e.g., the results of an oxygen sensor test or a non-continuous test) from the vehicle computer, and a second step of requesting a second set of information from the vehicle computer after receiving the first set of information from the vehicle computer. The second step of requesting a second set of information is preferably performed about 60 seconds or less after receiving the first set of information. In a further embodiment of the invention, the step of requesting two or more different types of information comprises a third step of requesting a third set of information from the vehicle computer. This step is preferably performed about 60 seconds or less after receiving the second set of information.

In a preferred embodiment of the invention, the second step of requesting a second set of information is performed about 30 seconds or less (and preferably 20 seconds or less) after receiving the first set of information. Also, the third step of requesting a third set of information from the vehicle computer is preferably performed about 30 seconds or less (and preferably 20 seconds or less) after receiving the second set of information.

As noted above, one embodiment of the invention comprises the general concept of using a scan tool to reset active emissions system error indicators on a vehicle.

A method of resetting one or more active emission system error indicators according to yet another embodiment of the invention comprises the steps of: (1) placing a vehicle on a dynamometer; and (2) while the vehicle is on the dynamometer, requesting two or more different types of information from a computer within the vehicle. In a preferred embodiment of the invention, this method comprises requesting, in a pre-determined sequence, two or more different types of information from the computer. In a further preferred embodiment of the invention, a scan tool is used to perform the step of requesting two or more different types of information from the computer.

As will be understood by one skilled in the art, while the inventive concepts described above are referred to as inventive methods, the present invention may also be embodied in systems or devices that are configured to perform the methods referenced herein. In addition, the present invention may also be embodied in a computer readable medium storing computer-readable instructions for executing the methods referenced herein. In various embodiments of the invention, the systems, devices, or computer-readable instructions are configured for executing the various steps of the various methods referenced herein substantially automatically (i.e., substantially without human intervention).

BRIEF DESCRIPTION OF THE DRAWINGS

Figure 1A:
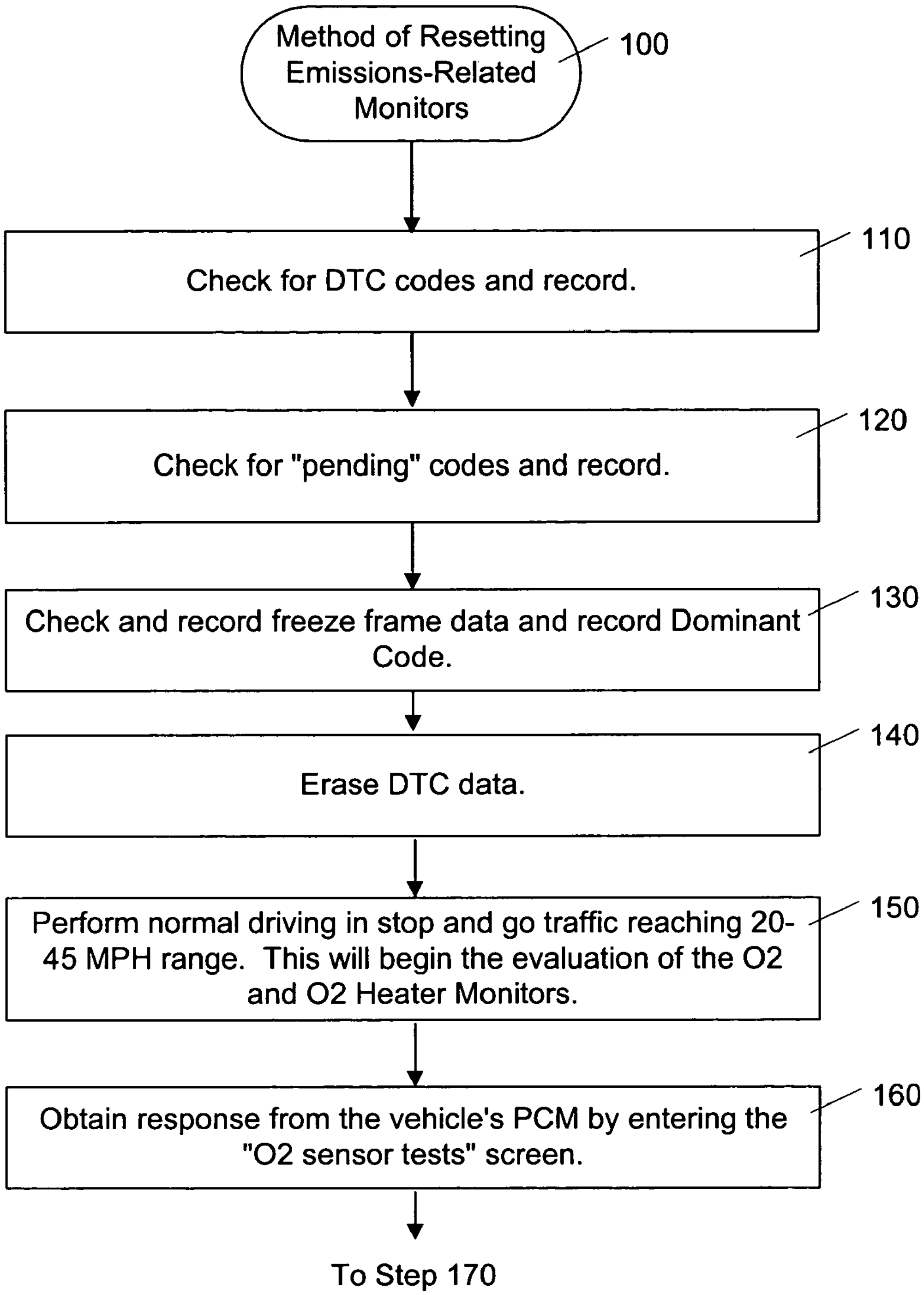
Figure 1B:
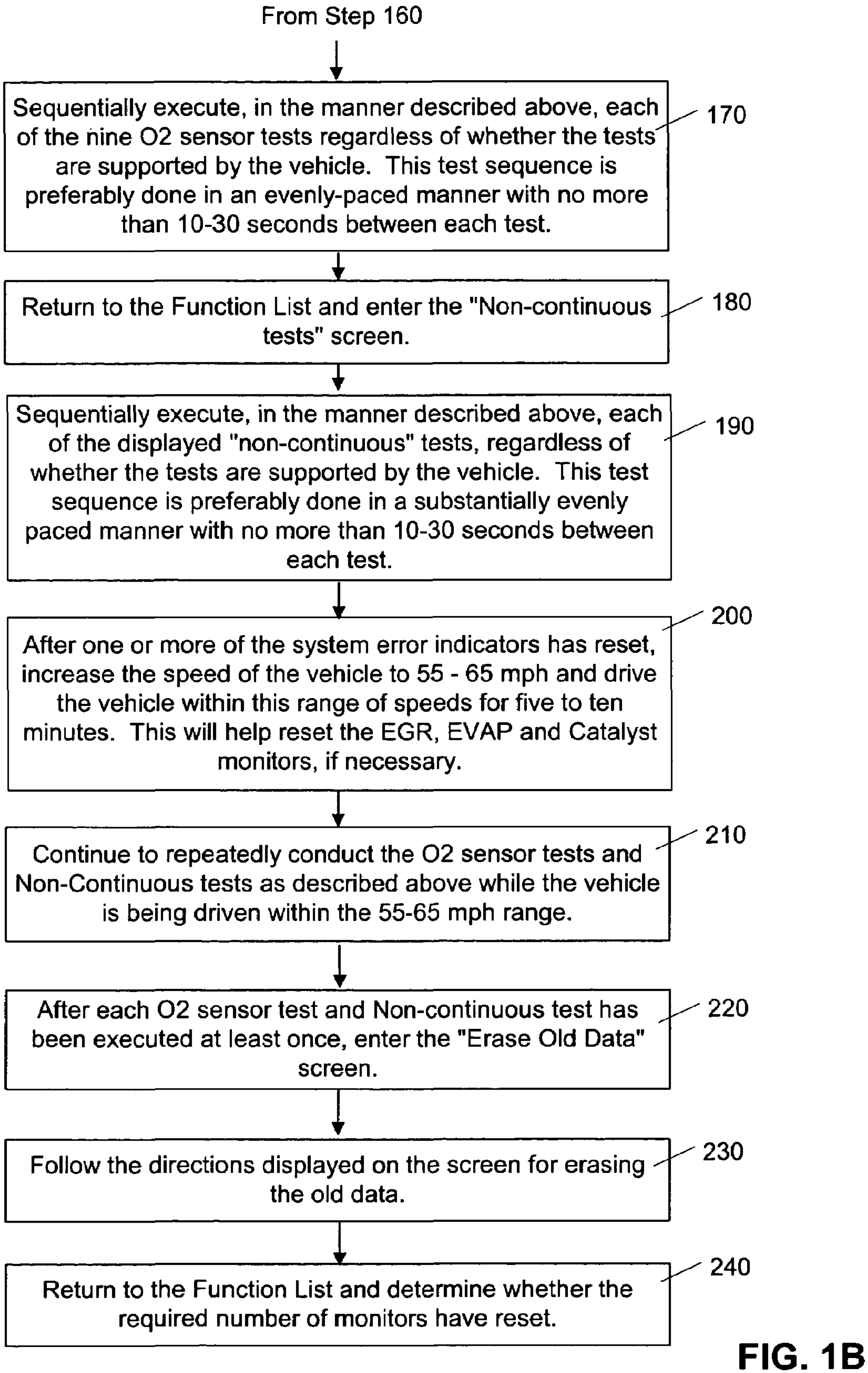

Having thus described the invention in general terms, reference will now be made to the accompanying drawings, wherein:

FIGS. 1A and 1B depict a method of resetting emissions-related monitors according to a particular embodiment of the invention.

DETAILED DESCRIPTION OF THE INVENTION

The present invention will now be described in greater detail, and in reference to various particular embodiments of the invention. As will be understood by one skilled in the relevant field, the invention may be embodied in many different forms and should not be construed as limited to the embodiments set forth below. Rather, these embodiments are provided so that this disclosure will be thorough and complete, and will fully convey the scope of the invention to those skilled in the art.

It should also be understood that, while certain embodiments of the invention comprise inventive methods that include one or more steps, in some circumstances, certain of these steps may be omitted or executed in different sequences than described herein, and that additional steps may be added without taking the method outside the scope of the present invention.

The methods described herein may be performed while the vehicle is operating on a paved surface, such as a road, or on an unpaved surface. Alternatively, the methods described herein may be performed while the vehicle is disposed on a dynamometer (e.g., one or more substantially stationary spinning rollers).

In order to use a method according to one embodiment of the invention to reset one or more active emission system error indicators, a user first warms up the vehicle's engine for at least five minutes. In another embodiment of the invention, the user may omit this step.

The user then connects a diagnostic tool (preferably an electronic diagnostic tool), to the vehicle in a manner known in the art. In a preferred embodiment of the invention, the diagnostic tool is a scan tool, such as the MD 2001A Professional Enhanced Scan Tool referenced above.

The user then uses the diagnostic tool to retrieve information from one or more of the vehicle's oxygen sensors. As described in detail in the user manual for the MD 2001A Professional Enhanced Scan Tool, to do this, the user preferably selects an "O2 monitor test" option from the OBD II function list to indicate that the user would like to use the diagnostic tool to initiate one or more oxygen sensor tests.

The user then uses the diagnostic tool to initiate, preferably in sequence, two or more oxygen sensor tests. During each of these tests, the diagnostic tool retrieves information from at least a particular one of the vehicle's oxygen sensors. In various preferred embodiments of the invention, the user uses the diagnostic tool to initiate at least three, four, five, six, seven, eight, nine, or more oxygen sensor tests. In a preferred embodiment of the invention, the user uses the diagnostic tool to initiate these tests substantially sequentially. When such tests are performed sequentially, the user uses the diagnostic tool to conduct one test at a time. Alternatively, the user may use the diagnostic tool to perform two or more of the tests simultaneously.

In a preferred embodiment of the invention, the diagnostic tool is configured to perform a plurality of different oxygen sensor tests. For example, the diagnostic tool is preferably configured to conduct two or more of the following oxygen sensor tests: (1) Rich to Lean sensor threshold voltage; (2) Lean to Rich sensor threshold voltage; (3) Low sensor voltage for switch time; (4) High sensor voltage for switch time; (5) Rich to Lean sensor switch time; (6) Lean to Rich sensor threshold voltage; (7) Low sensor voltage for switch time; (8) High sensor voltage for switch time; and (9) Rich to Lean sensor switch time.

In a preferred embodiment of the invention, the user uses the MD 2001A Professional Enhanced Scan Tool referenced above to perform the step of initiating two or more oxygen sensor tests. In this embodiment of the invention, the user first initiates a first oxygen sensor test (preferably the Rich to Lean sensor threshold voltage test) by selecting an appropriate button on the scan tool. After this first test is complete (e.g., the scan tool has displayed results for the first oxygen sensor test), the user preferably waits about 20 seconds or less, and then initiates a second oxygen sensor test (preferably the Lean to Rich sensor threshold voltage test). After this second test is complete, the user preferably waits about 20 seconds or less and then initiates a third oxygen sensor test (preferably the Low sensor voltage for switch time test). After this third test is complete, the user preferably waits about 20 seconds or less and then initiates a fourth oxygen sensor test (preferably the High sensor voltage for switch time test). After this fourth test is complete, the user preferably waits about 20 seconds or less and then initiates a fifth oxygen sensor test (preferably the Rich to Lean sensor switch time test). After this fifth oxygen sensor test is complete, the user preferably waits about 20 seconds or less and then initiates a sixth oxygen sensor test (preferably the Lean to Rich sensor threshold voltage test). After this sixth test is complete, the user preferably waits about 20 seconds or less and then initiates a seventh oxygen sensor test (preferably the Low sensor voltage for switch time test). After this seventh test is complete, the user preferably waits about 20 seconds or less and then initiates an eighth oxygen sensor test (preferably the High sensor voltage for switch time test). After this eighth test is complete, the user preferably waits about 20 seconds or less and then initiates a ninth oxygen sensor test (preferably the Rich to Lean sensor switch time test).

It should be understood that the above sequence of performing oxygen sensor tests may vary in order and timing from the sequence and timing pattern set forth above. For example, the user may execute the Lean to Rich sensor threshold voltage test as the first test rather than the second. Similarly, the user may execute the "High sensor voltage for switch time" test as the second test rather than the fourth.

By the same token, in one embodiment of the invention, two or more of the above oxygen sensor tests are performed simultaneously rather than sequentially. In another embodiment of the invention, the user waits longer than 20 seconds (e.g., about 50 seconds or less) after a particular oxygen sensor test is completed to initiate the next sequential oxygen sensor test. For example, in one embodiment of the invention, the user first initiates a first oxygen sensor test and, after this first test is complete, the user waits about 50 seconds or less, and then initiates a second oxygen sensor test.

In one embodiment of the invention, after the user completes at least two of the oxygen sensor tests as described above (and preferably after all nine of the oxygen sensor tests have been completed as described above), the user executes one or more "non-continuous tests". These tests are preferably executed in the manner set forth on pages 3–8 of the user manual for the MD 2001A Professional Enhanced Scan Tool. In one embodiment of the invention, the user executes a first non-continuous test within about 60 seconds (and preferably about 20 seconds or less) after completing the last of the oxygen sensor tests.

In a preferred embodiment of the invention, the user first sequentially executes each of three or more (and preferably all nine) oxygen sensor tests as described above, and then executes one or more "non-continuous tests" within about 60 seconds (and preferably about 20 seconds or less) after completing the last of the oxygen sensor tests. Such non-continuous tests, include, for example, tests for receiving data from the vehicle's catalyst and evaporative OBD II monitors.

In a preferred embodiment of the invention, the step of executing one or more "non-continuous tests" comprises executing (preferably in a sequential manner) two, three, four, five, six, seven, or more non-continuous tests. In one embodiment of the invention, the various non-continuous tests are executed no more than about 60 seconds (and preferably no more than about 20 seconds or less) apart. That is, there user executes each non-continuous test within 60 seconds (and preferably no more than about 20 seconds or less) of receiving the results from any immediately preceding non-continuous test.

After completing the last of the non-continuous tests, the user preferably repeats the oxygen sensor and non-continuous tests in the manner set forth above until one or more (and preferably all) of the vehicle's system error indicators resets.

In one embodiment of the invention, the user first executes the oxygen sensor and non-continuous tests repeatedly while driving the vehicle in stop and go traffic preferably between speeds of 20–45 mph. Next, in response to determining that one or more of the vehicle's oxygen sensor system error indicators have reset, the user preferably increases the speed of the vehicle to between 55 and 65 mph and then executes the oxygen sensor and non-continuous tests repeatedly while driving the vehicle in this range of speeds for five to ten minutes. This helps to activate and reset the EGR, EVAP and CATALYST monitors, if necessary.

In one embodiment of the invention, after the user completes the various oxygen sensor and non-continuous tests at least once while driving in the 55–65 mph range, the user executes an "erase old data" function on the diagnostic tool. This removes any old data stored during testing and reveals the newest, more recent data. The user then returns to the diagnostic tool's "function list" and determines whether the required system error indicators have reset. If the system error indicators have not reset at this time, the user returns to diagnostic tool's view data screen and uses this screen to determine whether further repairs are needed.

Method According to One Embodiment of the Invention

A method for resetting system error indicators on a vehicle according to one embodiment of the invention is described in step-by-step format below. This method is preferably performed using the MD 2001A Professional Enhanced Scan Tool referenced above.

Initial Procedure:
1. Connect Scan tool.
2. Choose OBD II Global vehicle.
3. Start vehicle.
4. Erase stored data from scan tool.
5. Go to function list.
6. Select IIM Readiness.
7. Check for and record Incomplete Monitors.
8. Allow engine to warm-up for 3–5 minutes.

After conducting the "Initial Procedure" described above, the user begins performing the various steps shown in FIGS. 1A and 1B, which are listed in sequence below.

1. At Step 110, check for DTC codes and record these codes.
2. Next, at Step 120, check for "pending" codes and record these codes.
3. Next, at Step 130, check and record freeze frame data and record the dominant code.
4. Next, at Step 140, erase DTC data.
5. Next, at Step 150, perform normal driving in stop and go traffic at speeds reaching the 20-45 MPH range. This will begin the evaluation of the $O_2$ and $O_2$ Heater Monitors.
6. Next, at Step 160, obtain a response from the vehicle's PCM by entering the "$O_2$ sensor tests" screen.
7. Next, at Step 170, sequentially execute, in the manner described above, each of the nine $O_2$ sensor tests regardless of whether the tests are supported by the vehicle. This test sequence is preferably done in a substantially evenly paced manner with no more than 10–30 seconds between each test.
8. Next, at Step 180, return to the Function List and enter the "Non-continuous tests" screen.
9. Next, at Step 190, sequentially execute, in the manner described above, each of the displayed "non-continuous" tests, regardless of whether the tests are supported by the vehicle or not. This test sequence is preferably done in a substantially evenly paced manner with no more than 10–30 seconds between each test.
10. Next, at Step 200, after one or more of the system error indicators has reset, increase the speed of the vehicle to 55–65 mph and drive the vehicle within this range of speeds for five to ten minutes. This will contribute to resetting the EGR, EVAP and Catalyst monitors, if necessary.
11. Next, at Step 210, continue to repeatedly run the $O_2$ sensor tests and Non-Continuous tests as described above while the vehicle is being driven at speeds between 55–65 mph.
12. Next, at Step 220, after each $O_2$ sensor test and Non-continuous test has been executed at least once, enter the "Erase Old Data" screen.
13. Next, at Step 230, follow the directions displayed on the screen for erasing the old data.
14. Finally, at Step 240, return to the Function List and determine whether the required number of monitors have reset.

If the Monitors Have Not Reset:
1. Go to the "View Data" screen.
2. Check and record the displayed values.
3. Compare the recorded values to anticipated "normal" values and determine if further repairs are needed.

Selected Advantages of the Inventive System and Method

Using a diagnostic tool to rapidly perform diagnostic tests on a vehicle's emissions system (for example, in the manner set forth above) serves to stimulate the vehicle's PCM to perform diagnostic tests earlier than it would under normal driving conditions, or under the driving conditions prescribed by a typical drive cycle. Thus, when executed properly, in one embodiment of the invention, the above techniques serve to reset the vehicle's system error indicators (e.g., reset the vehicle's readiness monitors) in much less time than prior art methods. For example, prior art methods for resetting a vehicle's system error indicators typically take over 75 minutes, and often several hours, or days, to complete. In contrast, various embodiments of the invention may be used to reset a vehicle's system error indicators in one to 15 minutes, provided there are no mechanical problems that would prevent it from doing so. In addition, various methods disclosed herein may be used to quickly and accurately identify whether the vehicle's emission system needs to be repaired and, if so, what repairs are needed.

As will be understood by one skilled in the art, it is currently understood in the automotive field that, in order to reset a vehicle's readiness monitors, it is necessary to drive the vehicle through certain driving patterns under predetermined operating conditions (such as those included in an appropriate drive cycle). For example, in the most recent issue of "OBDII Drive Cycle Guide, 1996-2002 Domestic & Import Cars, Light Trucks, Vans, and SUVs", which was published in 2002 by MOTOR Information Systems of Troy, Michigan, the author notes "(i)n order to reset the readiness monitors to 'Ready', certain driving patterns and operating conditions must be met. Unlike DTCs, Readiness Monitors cannot be manipulated via a scan tool." Similarly, the author states that "The monitored system cannot be checked when the engine is started briefly and is shut-down, nor can the status of the monitor be re-set through the scan tool. The scan tool can verify the status of the monitor, but cannot change the status." (See page ix). Accordingly, in a manner contrary to current teachings and practices in the automotive field, the above method allows technicians to legally and effectively use a scan tool to quickly reset a vehicle's readiness monitors without executing a complicated, time consuming prior art drive cycle.

Automated Device for Performing the Above Methods

While various methods described herein are described as being performed by a technician using a tool, such as a scan tool, it should be understood that the present invention includes devices (such as electronic devices) that are configured (e.g., programmed) for executing one or more steps of any of the above methods substantially automatically (e.g., without human intervention).

Conclusion

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What I claim is:

1. A method of resetting an active emissions system error indictor associated with a vehicle, said method comprising performing a first requesting step and a second requesting step until said active emissions system error indicator resets in response to at least one of said first or second requesting steps, and wherein:

said first requesting step comprises requesting a first type of information from a vehicle computer associated with said vehicle; and said second requesting step comprises requesting a second type of information from said vehicle computer.

2. The method of claim 1, wherein said step of performing a first requesting step and a second requesting step until said active emissions system error indicator resets comprises performing said first and second requesting steps in a pre-determined sequence.

3. The method of claim 1, wherein said step of performing a first requesting step and a second requesting step until said active emissions system error indicator resets comprises performing said first and second requesting steps at about the same time.

4. The method of claim 1, wherein said first requesting step is executed electronically.

5. The method of claim 4, wherein said second requesting step is executed electronically.

6. The method of claim 1, wherein said first type of information comprises emissions-related information.

7. The method of claim 6, wherein said second type of information comprises emissions-related information.

8. The method of claim 6, wherein said first type of information is information that has been acquired from one or more sensors within said vehicle.

9. The method of claim 8, wherein said second type of information is information that has been acquired from said one or more sensors.

10. The method of claim 9, wherein each of said one or more sensors is adjacent said vehicle's engine.

11. The method of claim 1, wherein said first type of information is information that has been acquired from a first oxygen sensor within said vehicle.

12. The method of claim 11, wherein:

said vehicle comprises an engine comprising a first cylinder bank; and said first oxygen sensor is disposed adjacent said first cylinder bank, upstream of a catalyst associated with said first cylinder bank.

13. The method of claim 11, wherein:

said vehicle has an engine comprises a first cylinder bank; and said first oxygen sensor is disposed adjacent said first cylinder bank, downstream of a catalyst associated with said first cylinder bank.

14. The method of claim 11, wherein said second type of information is information that has been acquired from a second oxygen sensor within said vehicle.

15. The method of claim 14, said vehicle comprises an engine that comprises a first cylinder bank; and said first oxygen sensor is disposed adjacent said first cylinder bank, upstream of a catalyst associated with said first cylinder bank; and said second oxygen sensor is disposed adjacent said first cylinder bank, downstream of said first catalyst.

16. The method of claim 14, wherein:

said method further comprises a third requesting step, said third requesting step comprising the step of requesting a third type of information from said vehicle computer; and said third type of information is information that has been acquired from a third oxygen sensor within said vehicle.

17. The method of claim 16, wherein:

said vehicle has an engine that comprises both a first cylinder bank and a second cylinder bank;

said first oxygen sensor is disposed adjacent said first cylinder bank, upstream of a catalyst associated with said first cylinder bank;

said second oxygen sensor is disposed adjacent said first cylinder bank, downstream of said first catalyst; and said third oxygen sensor is disposed adjacent said second cylinder bank, upstream of a catalyst associated with said second cylinder bank.

18. The method of claim 16, wherein:

said method further comprises a fourth requesting step, said fourth requesting step comprising the step of requesting a fourth type of information from said vehicle computer; and said fourth type of information is information that has been acquired from a fourth oxygen sensor within said vehicle.

19. The method of claim 18, wherein:

said vehicle comprises an engine comprising both a first cylinder bank and a second cylinder bank;

said first oxygen sensor is disposed adjacent said first cylinder bank, upstream of a first catalyst that is associated with said first cylinder bank;

said second oxygen sensor is disposed adjacent said first cylinder bank, downstream of said first catalyst;

said third oxygen sensor is disposed adjacent said second cylinder bank, upstream of a second catalyst that is associated with said second cylinder bank; and said fourth oxygen sensor is disposed adjacent said second cylinder bank, downstream of said second catalyst.

20. The method of claim 1, wherein said first requesting step is executed using a scan tool.

21. The method of claim 1, wherein said scan tool is a bidirectional scan tool.

22. The method of claim 20, wherein said second requesting step is executed using said scan tool.

23. The method of claim 22, wherein said scan tool is a bidirectional scan tool.

24. The method of claim 1, wherein said first requesting step comprises performing at least one non-continuous test on an engine within said vehicle.

25. The method of claim 24, wherein said non-continuous test provides test results from a catalyst monitor.

26. The method of claim 25, wherein said non-continuous test provides test results from an OBD-2 monitor.

27. The method of claim 1, wherein:

said first requesting step comprises a step of requesting a first set of information from said vehicle computer;

said method comprises receiving said first set of information from said vehicle computer;

said second requesting step comprises a step of requesting a second set of information from said vehicle computer after receiving said first set of information from said vehicle computer; and said method comprises receiving said second set of information from said vehicle computer.

28. The method of claim 27, wherein said first set of information comprises the results of an oxygen sensor test.

29. The method of claim 27, wherein said first set of information comprises the results of a non-continuous test.

30. The method of claim 27, wherein second requesting step is performed about 60 seconds or less after said step of receiving said first set of information from said vehicle computer.

31. The method of claim 30, wherein said second requesting step is performed about 30 seconds or less after said step of receiving said first set of information from said vehicle computer.

32. The method of claim 30, wherein:

said method further comprises a third requesting step that comprises requesting a third set of information from said vehicle computer; and said third requesting step is performed about 60 seconds or less after said step of receiving said second set of information from said vehicle computer.

33. The method of claim 32, wherein:

said second requesting step is performed about 30 seconds or less after said step of receiving said first set of information; and said third requesting step is performed about 30 seconds or less after said step of receiving said second set of information.

34. The method of claim 1, wherein:

said method comprises receiving said first type of information from said vehicle computer; and said method comprises executing said second requesting step after receiving said first type of information from said vehicle computer.

35. A method of resetting one or more active emission system error indicators associated with a vehicle, said method comprising the steps of:

placing said vehicle on a dynamometer; and while said vehicle is on said dynamometer, requesting two or more different types of information from a computer within said vehicle until at least one of said active emission system error indicators resets.

36. The method of claim 35, further comprising requesting said two or more different types of information in a predetermined sequence.

37. The method of claim 35, wherein a scan tool is used to perform said step of requesting two or more different types of information from said computer.

38. An electronic device for resetting an active emissions system error indictor associated with a vehicle, said electronic device being configured for:

performing a first requesting step and a second requesting step until said active emissions system error indicator resets in response to at least one of said first or second requesting steps, and wherein:

said first requesting step comprises requesting a first type of information from a vehicle computer associated with said vehicle;

said second requesting step comprises requesting a second type of information from said vehicle computer; and said electronic device is configured for performing said first requesting step and said second requesting step substantially automatically until said active emissions system error indicator resets.

39. The electronic device of claim 38, said electronic device being configured for:

determining whether said active emissions system error indicator has reset; and in response to determining that said active emissions system error indicator has reset, stopping execution of said first and second requesting steps.

40. The electronic device of claim 38, wherein said step of performing a first requesting step and a second requesting step until said active emissions system error indicator resets comprises performing said first and second requesting steps in a pre-determined sequence.

41. The electronic device of claim 38, wherein said step of performing a first requesting step and a second requesting step until said active emissions system error indicator resets comprises performing said first and second requesting steps at about the same time.

42. The electronic device of claim 38, wherein said first type of information is information that has been acquired from one or more sensors within said vehicle.

43. The electronic device of claim 38, wherein said second type of information is information that has been acquired from said one or more sensors.

44. The electronic device of claim 38, wherein said first requesting step comprises performing at least one non-continuous test on an engine associated with said vehicle.

45. The electronic device of claim 38, wherein:

said first requesting step comprises a step of requesting a first set of information from said vehicle computer;

said electronic device is configured for receiving said first set of information from said vehicle computer;

said second requesting step comprises a step of requesting a second set of information from said vehicle computer after receiving said first set of information from said vehicle computer; and said electronic device is configured for receiving said second set of information from said vehicle computer.

46. The electronic device of claim 45, wherein second requesting step is performed about 60 seconds or less after said step of receiving said first set of information from said vehicle computer.

47. The electronic device of claim 45, wherein:

said method further comprises a third requesting step that comprises requesting a third set of information from said vehicle computer; and said third requesting step is performed about 60 seconds or less after said step of receiving said second set of information from said vehicle computer.

48. A computer-readable medium storing computer-executable instructions for:

performing a first requesting step and a second requesting step until said active emissions system error indicator associated with said vehicle resets in response to at least one of said first or second requesting steps, and wherein:

said first requesting step comprises requesting a first type of information from a vehicle computer associated with said vehicle;

said second requesting step comprises requesting a second type of information from said vehicle computer; and said computer-executable instructions include instructions for performing said first requesting step and said second requesting step substantially automatically until said active emissions system error indicator resets.

49. The computer-readable medium of claim 48, further comprising computer-executable instructions for:

determining whether said active emissions system error indicator has reset; and in response to determining that said active emissions system error indicator has reset, stopping execution of said first and second requesting steps.

50. The computer-readable medium of claim 48, wherein said step of performing a first requesting step and a second requesting step until said active emissions system error indicator resets comprises performing said first and second requesting steps in a pre-determined sequence.

51. The computer-readable medium of claim 48, wherein said step of performing a first requesting step and a second requesting step until said active emissions system error indicator resets comprises performing said first and second requesting steps at about the same time.

52. The computer-readable medium of claim 48, wherein said first type of information is information that has been acquired from one or more sensors within said vehicle.

53. The computer-readable medium of claim 48, wherein said second type of information is information that has been acquired from said one or more sensors.

54. The computer-readable medium of claim 48, wherein said first requesting step comprises performing at least one non-continuous test on an engine associated with said vehicle.

55. The computer-readable medium of claim 48, wherein:

said first requesting step comprises a step of requesting a first set of information from said vehicle computer;

said computer-readable medium stores computer-executable instructions for receiving said first set of information from said vehicle computer;

said second requesting step comprises a step of requesting a second set of information from said vehicle computer after receiving said first set of information from said vehicle computer; and said computer-readable medium stores computer-executable instructions for receiving said second set of information from said vehicle computer.

56. The computer-readable medium of claim 55, wherein second requesting step is performed about 60 seconds or less after said step of receiving said first set of information from said vehicle computer.

57. The computer-readable medium of claim 55, wherein:

said method further comprises a third requesting step that comprises requesting a third set of information from said vehicle computer; and said third requesting step is performed about 60 seconds or less after said step of receiving said second set of information from said vehicle computer.

* * * * *